United States Patent [19]

Morishita et al.

[11] 4,455,525
[45] Jun. 19, 1984

[54] CONTROL UNIT FOR GENERATOR DRIVEN BY ENGINE

[75] Inventors: Mitsuharu Morishita, Hyogo; Hiroyuki Kobayashi; Toyoaki Fukui, both of Kyoto, all of Japan

[73] Assignee: Mitsubishi Denki Kabushiki Kaisha, Tokyo, Japan

[21] Appl. No.: 446,764

[22] Filed: Dec. 3, 1982

[30] Foreign Application Priority Data

Dec. 4, 1981 [JP] Japan ............................ 56-180719[U]

[51] Int. Cl.³ ............................................... H02J 7/14
[52] U.S. Cl. ........................................ 322/28; 322/29; 322/80; 322/83
[58] Field of Search ................... 322/28, 29, 59, 72, 322/73, 80, 83, 84

[56] References Cited

U.S. PATENT DOCUMENTS 2,840,775 6/1958 Steadman .......................... 322/29 X
3,486,106 12/1969 Dietl ................................ 322/73 X Primary Examiner—R. J. Hickey
Attorney, Agent, or Firm—Bernard, Rothwell & Brown

[57] ABSTRACT

A control unit is disclosed for controlling the driving torque of a generator driven by an engine in accordance with the number of cylinders to be operated, thereby to achieve stabilized operation. A voltage regulator is provided for varying the field current through the field coil of the generator so as to regulate the output of the generator. A circuit component including a pair of NC contacts in parallel with a resistor is connected in series between the field coil of the generator and a power source. Depending on the number of cylinders to be operated, the NC contacts are either closed to provide a low resistance path for current to the field coil or are opened to provide a high resistance path through the resistor.

3 Claims, 4 Drawing Figures

CONTROL UNIT FOR GENERATOR DRIVEN BY ENGINE

BACKGROUND OF THE INVENTION

1. Field of the Invention

The present invention relates to a control unit for a generator driven by an engine being provided with a plurality of cylinders, and particularly to a control unit for a generator driven by such an engine in which a certain number of cylinders to be operated is suitably selected in accordance with the current operating conditions.

2. Description of the Prior Art

A conventional control unit of the type mentioned above has been constructed as illustrated in FIG. 1 in which an AC generator is driven by a so-called cylinder number variable engine mounted on a vehicle (not shown) and in which a suitable number of cylinders to be ignited for reducing fuel consumption is selected in accordance with its load. The AC generator comprises armatkure coils 101 connected to each other in three-phase star manner and a field coil 102 being related magnetically to the armature coils 101 and in which current supplied to the field coil 102 is controlled as described hereinbelow. The coils 101 are bridge-connected by means of diodes of a full-wave rectifier 2 to supply DC output. First and second rectification output ends 201 and 202 of the rectifier at each of which cathodes of the diodes in each phase are commonly connected to one another are connected with a positive terminal of a battery 4 and a control input terminal of a voltage regulator 3, respectively, whilst a third rectification output end 203 of the rectifier at which anodes of the diodes are commonly connected is connected with its vehicle chassis, i.e., ground.

The voltage regulator 3 includes resistances 307 and 308 connected in series between the control input terminal and ground for dividing voltage applied from the output terminal 202; a transistor 305 to the base of which the voltage divided is inputted through a Zener diode 306 and the collector of which is connected to the control input end through resistances 304 and 309; and a transistor 303, the base of which is connected to the collector of the transistor 305, being Darlington-connected with a transistor 302. Collectors of the transistors 302 and 303 provide a control output end to be connected with the coil 102 and these collectors are connected to the control input end through a diode 301. A connection point between the resistances 304 and 309 is connected to the positive terminal of the battery 4 and to the output end 202 through a charge display lamp 6 and a diode 7.

In operations of the conventional control unit as described above, when a switch 5 is closed in relation to starting of the engine, a current is supplied from the battery 4 to the base of the transistor 303 through the switch 5, the diode 310 and the resistance 304 so that the transistors 302 and 303 are turned ON to ground an end of the coil 102 therethrough. Thus, the field current is supplied from the battery 4 through the switch 5, the lamp 6, the diode 7, the output end 202, and the coil 102 to turn of the lamp 6. When the engine starts the rotation thereof, the coil 101 induces AC output corresponding to speed of revolution of the engine as well as field current of the coil 102 to supply the resulting AC to the rectifier 2. When the voltage from the output end 202 of the rectifier 2 rises to reach a value higher than the voltage of the battery 4, the diode 7 is reversely biased so that the current passing through the lamp 6 is interrupted to turn off the lamp. Furthermore, when the output voltage rises, the Zener diode 306 is turned ON so that the transistor 305 is turned ON, whereby the transistors 302 and 303 are succeedingly turned OFF. As the result, the field current of the coil 102 is interrupted to lower the AC output of the coil 101. When the AC output lowers, the transistors 302 and 303 again turn ON so that the above-mentioned operations are repeated. Thus, the output of the generator 1 is regulated, whereby charging current of the battery 4 is adjusted to an optimum value.

However, such engine for driving the generator as described above is liable to become unstable in respect of the rotation thereof, for instance, the engine generates abnormal vibration and the like undesirable phenomena due to fluctuation of load, because the torque generated is small in the case where the engine is driven by a decreased number of the cylinders thereof, more specifically, where the engine is in its idling mode. Therefore, it is desirable that such generator is controlled as a load of the engine in such a manner that its required driving torque corresponds to the rotation of the engine.

SUMMARY OF THE INVENTION

It is an object of the present invention to provide a control unit for controlling the required torque of a generator by which stabilized rotation of its engine can be achieved even in such an operational condition wherein number of cylinders to be operated of the engine is reduced.

According to the present invention, there is provided a control unit for a generator means driven by such an engine in which the number of cylinders to be operated is selectively controlled comprising a field coil to which controlled field current is supplied and a rectifier for rectifying AC output of an armature to convert the same into DC electric power. The control unit is further provided with a voltage regulator connected in series between an end of said field coil and ground with sail field current switched such that the voltage at the rectification output end of said rectifier comes to be a predetermined value, and a switching means being connected between the aforesaid rectification output end and another end of the aforesaid field coil to be ON state when such a control signal indicating reduction of number of cylinders to be operated in the engine is not supplied, whilst to be a high resistance state when the control signal is supplied thereto. Thus, the current to be supplied to the field coil is controlled, whereby the load of the engine i.e. the generator means is controlled so as to obtain smooth rotation in its low driving torque region.

BRIEF DESCRIPTION OF THE DRAWINGS

The above and other objects as well as the advantages of the present invention will become apparent from the following detailed description taken in conjunction with the accompanying drawings, in which like reference characters designate like or corresponding parts throughout several views.

DESCRIPTION OF A PREFERRED EMBODIMENT

Figure 1:
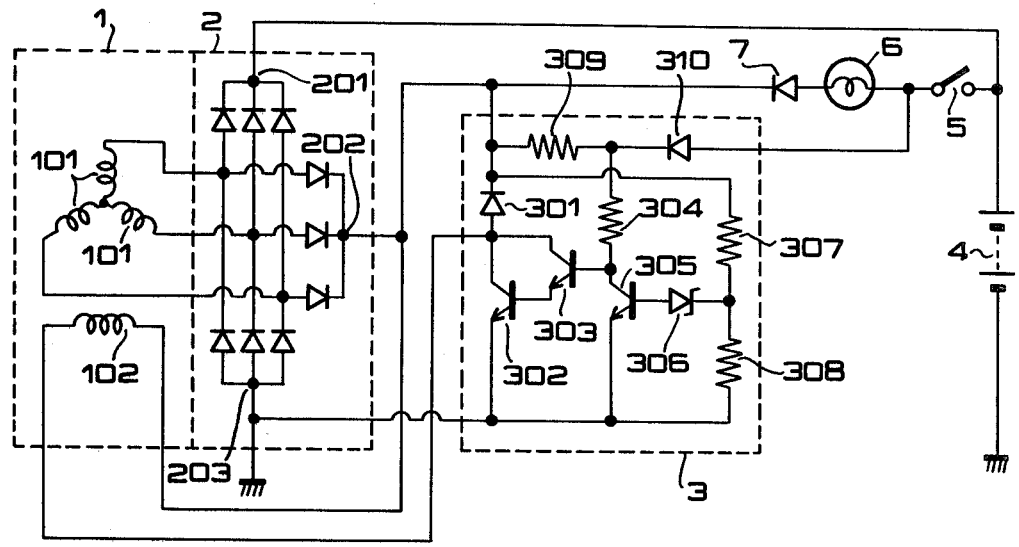
FIG. 1 is a block diagram illustrating a conventional control unit for a generator.
Figure 2:
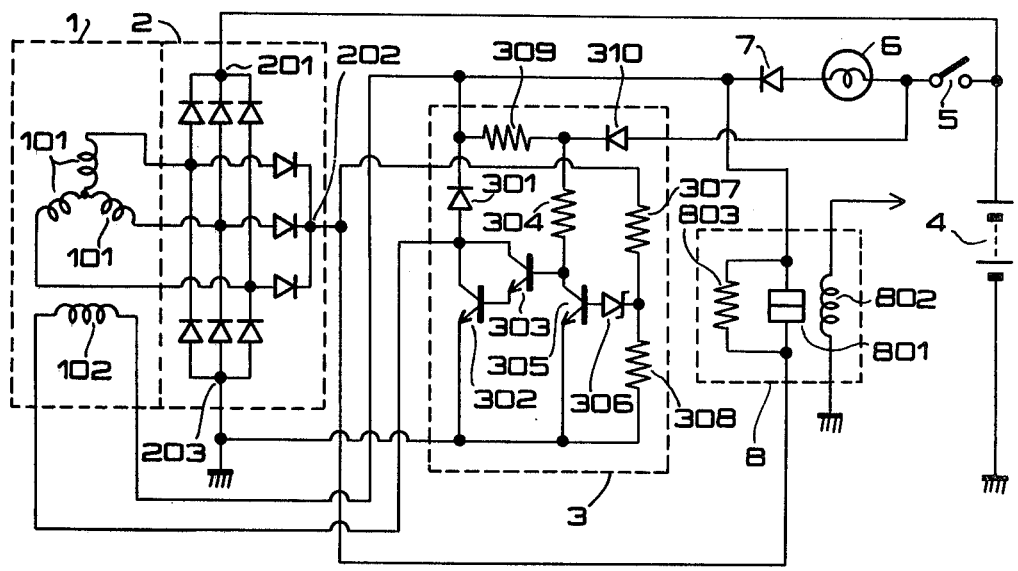
FIG. 2 is a block diagram illustrating a control unit for a generator according to the present invention.

FIG. 2 is the diagram in which a circuit for the control unit according to the present invention is illustrated wherein corresponding parts to those in FIG. 1 are designated by the same reference characters, and further the description duplicated in respect of FIG. 1 will not be repeated hereinbelow.

A field current limiting relay 8 has NC contacts for connecting an output end 202 with cathode of a diode 7, a driving coil 802 which is energized to open the NC contacts 801 when idling operation control signal indicating reduction of a number of cylinders to be operated is supplied from the control unit for its engine (not shown), and a resistance 803 being connected in parallel to the NC contacts and limiting field current in a coil 102. The output end 202 is connected to an end of a resistance 307 which, with resistance 308, forms a voltage divider, and a connection point of the cathode of the diode 301 with the resistance 309 is connected to an end of the coil 102 and the cathode of the diode 7.

Now, a switch 5 is turned ON to activate all the cylinders of the engine, current for turning ON a transistor 303 is supplied from a battery 4 to the base of the transistor 303 through the switch 5, the diode 310, and the resistance 304, whilst the field current flows through the switch 5, the lamp 6, the diode 7, the coil 102, the transistor 302, and the transistor 303 to excite the coil 102 and turn on the lamp 6. When the number of revolutions of the engine increases, in other words, when output voltage appearing at the output end 202 of a rectifier 2 reaches such a value sufficient for backbiasing the diode 7, the field current flowing through the lamp 6 is interrupted to turn off the lamp 6. Thereafter, the field current for the coil 102 is supplied through the output end 202 and the contacts 801.

Next, as a result of completing warm-up operation of the engine, control signal is supplied from an engine control unit (not indicated) to energize the coil 802 so as to reduce whose number of cylinders to be operated, whereby the contacts 801 are opened, and the field current is supplied to the coil 102 through the output end 202 and the resistance 803.

Figure 3A:
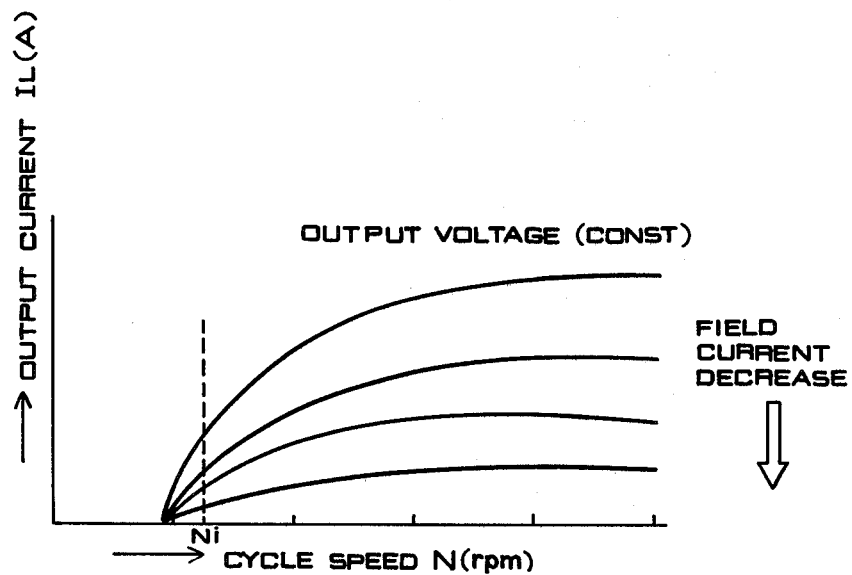
FIGS. 3A and 3B are graphical representation each indicating characteristics of the generator of FIG. 2.

Referring now to FIG. 3A, output current $I_L$ (ampere) at the output end 202 with respect to speed of revolution N (r.p.m.) of the engine is represented in respective field current parameters. As is apparent from the graphical representation, when a value of the resistance 803 is selected, the output current $I_L$ in the case where the speed of revolution is Ni can suitably be selected so that the load to be given to the engine can also be selected.

Figure 3B:
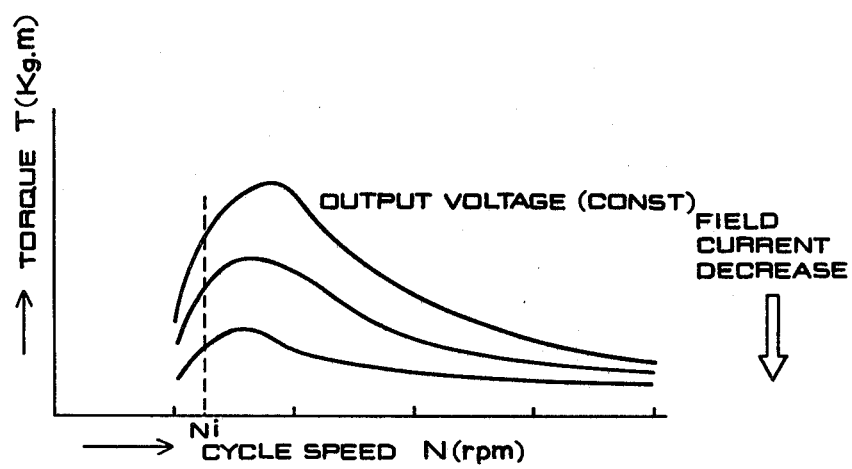

On the other hand, driving torque T (kg.m) of a generator 1 with respect to the speed of revolution N (r.p.m.) is represented in FIG. 3B in respective field current parameters. As indicated in FIG. 3B, the driving torque T decreases also with decrease of the field current to reduce the load of the engine.

The field current is subjected to such control with the present invention as mentioned above and also controlled by means of a conventional regulator 3 as described in respect of FIG. 1, whereby charging current of the battery 4 is controlled so as to make the value thereof optimum.

It will be, of course, apparent by those skilled in the art that semiconductor switches each of which is turned ON by means of control signal may be utilized for the contacts 801 and the coil 802.

Although a preferred embodiment of the invention has been illustrated and described, it is apparent by those skilled in the art that various modifications and changes may be made without departing from the spirit of the invention or the scope of the appended claims.

What is claimed is:

1. A control unit for a generator driven by an engine in which the number of cylinders to be operated is selectively controlled including a field coil for the generator supplied with controlled field current and a rectifier for rectifying AC output of the armature of the generator to convert the AC output into DC output, said control unit comprising:
   (a) a voltage regulator connected in series between one end of said field coil and ground for switching the field current so that the voltage at the rectification output end of said rectifier is maintained at a predetermined value;
   (b) a circuit component comprising switch and a resistor connected in parallel;
   (c) said circuit component being connected between said rectification output end of said rectifier and the other end of said field coil; and
   (d) means responsive to a control signal indicative of reduction of the number of cylinders to be operated for opening said switch to cause said field current to be limited by said resistor.

2. The control unit of claim 1 wherein said switch comprises a pair of NC contacts.

3. The control unit of claim 1 wherein said switch comprises semiconductor means.

* * * * *

UNITED STATES PATENT AND TRADEMARK OFFICE
CERTIFICATE OF CORRECTION

PATENT NO. : 4,455,525

DATED : June 19, 1984

INVENTOR(S) : Mitsuharu Morishita et al.

It is certified that error appears in the above-identified patent and that said Letters Patent is hereby corrected as shown below:

Column 1, line 22, "armatkure" should read --armature--.

Column 1, line 63, "of" should read --on--.

Column 2, line 43, "sail" should read --said--.

Signed and Sealed this

Fifteenth Day of January 1985

[SEAL]

Attest:

GERALD J. MOSSINGHOFF

Attesting Officer

Commissioner of Patents and Trademarks